United States Patent
Trika (10) Patent No.: US 10,719,462 B2
(45) Date of Patent: Jul. 21, 2020

(54) TECHNOLOGIES FOR COMPUTATIONAL STORAGE VIA OFFLOAD KERNEL EXTENSIONS

(71) Applicant: Intel Corporation, Santa Clara, CA (US)

(72) Inventor: Sanjeev Trika, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/141,411

(22) Filed: Sep. 25, 2018

(65) Prior Publication Data
US 2019/0042501 A1   Feb. 7, 2019

(51) Int. Cl.
*G06F 13/28* (2006.01)
*G06F 13/16* (2006.01)
*G06F 12/10* (2016.01)

(52) U.S. Cl.
CPC ............. *G06F 13/28* (2013.01); *G06F 12/10* (2013.01); *G06F 13/1668* (2013.01); *G06F 2212/1024* (2013.01); *G06F 2212/657* (2013.01)

(58) Field of Classification Search
None
See application file for complete search history.

(56) References Cited

U.S. PATENT DOCUMENTS

| | | | | |
|---|---|---|---|---|
| 8,316,201 | B2* | 11/2012 | Stern | G06F 11/1008 711/165 |
| 2007/0180210 | A1* | 8/2007 | Thibadeau | G06F 12/1458 711/163 |
| 2012/0221767 | A1* | 8/2012 | Post | G06F 13/1673 711/103 |
| 2015/0324134 | A1* | 11/2015 | Sendelbach | G06F 12/0868 710/310 |

\* cited by examiner

*Primary Examiner* — Idriss N Alrobaye
*Assistant Examiner* — Dayton Lewis-Taylor
(74) *Attorney, Agent, or Firm* — Barnes & Thornburg LLP (57) ABSTRACT

Technologies for data processing or computation on data storage devices include a data storage controller. The data storage controller is configured to receive a data request from a compute device, determine an input data range specified by the compute device to be processed in the data storage device without sending data located at the input data to the compute device, read input data from the input data range, perform a data operation on the input data specified by the compute device to generate output data, and write the output data to an output data range specified by the compute device.

20 Claims, 4 Drawing Sheets

TECHNOLOGIES FOR COMPUTATIONAL STORAGE VIA OFFLOAD KERNEL EXTENSIONS

BACKGROUND

Open Computing Language (OpenCL) is a parallel computing platform that may be used to write codes that are executed across heterogeneous platforms to deploy offload kernels. In OpenCL, parallel compute kernels may be offloaded from a host compute device to a heterogeneous device in the same system, such as a central processing unit (CPU), a graphics processing unit (GPU), Field-Programmable Gate Array (FPGA), or other processor or accelerator of the host compute device that is OpenCL-capable or compatible. Typically, OpenCL requires a device that is going to process OpenCL offload kernels to receive input data from a host memory. In other words, if the OpenCL kernel were to run inside the data storage device on data stored in a data storage device, it requires the data storage device to transmit the data from the storage device to a memory of the host compute device and receive the data back from the memory of the host compute device to the storage device for execution, which results in a wasteful data flow.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
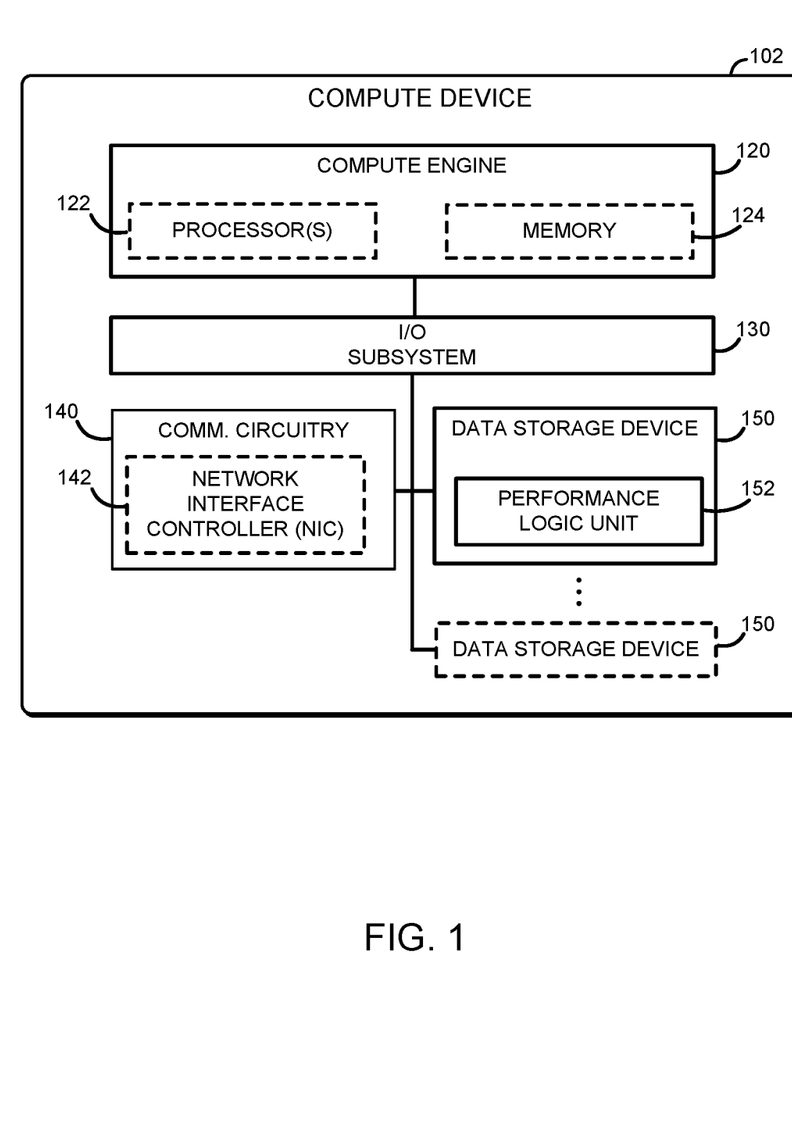
FIG. 1 is a simplified block diagram of at least one embodiment of a compute device that includes one or more data storage devices.

Referring now to FIG. 1, an illustrative compute device 102 for offload kernel instantiation on data storage devices includes one or more data storage devices 150. In use, the compute device 102 may specify one or more offload kernels that are configured to be executed on a target device in a heterogeneous-programming language, such as Open Computing Language (OpenCL). For example, Open Computing Language (OpenCL) is a parallel computing platform that may be used to write codes that are executed across heterogeneous platforms to deploy offload kernels. Typically, the target device (i.e., an OpenCL-capable or compatible devices) includes a central processing unit (CPU), a graphics processing unit (GPU), Field-Programmable Gate Array (FPGA), or other processors or accelerator of the compute device 102. In the illustrative embodiment, the one or more offload kernels may be configured to be executed inside the data storage device 150 to allow data processing or computation directly inside the data storage device 150 for an efficient data flow.

To do so, the compute device 102 may specify parameters to the one or more offload kernels and deploy the offload kernels to the data storage device 150. The parameters may include an input data range of input data in the data storage device 150 (e.g., a logical block address (LBA), an offset within the LBA, and a number of bytes of data) to be processed inside the data storage device 150 and an output data range where output data is to be written. Subsequently, an offload application program interface (API) may be extended to instantiate one or more offload kernels inside the data storage device 150 (e.g., on an unused processor core, a specified controller/accelerator, or one or more shared processor cores of the data storage device 150 that is already being used by a firmware). This allows the data to be read from the data storage device 150 and processed inside the data storage device 150 without having to transfer the data to a memory of the host compute device 102 and back into the data storage device 150 to be processed. Alternatively, in some embodiments, the data storage device 150 may include an in-built read-kernel, an in-built compute-kernel, and an in-built write-kernel. In such embodiments, the compute device 102 may leverage existing functionalities of the data storage device 150 to read input data from the data storage device 150, process the input data, and write processed data to the data storage device 150 based on the parameters specified by the compute device 102.

In the illustrative embodiment, each data storage device 150 includes a corresponding performance logic unit 152, which may be embodied as software or circuitry (e.g., a co-processor, a microcontroller, an application specific integrated circuit (ASIC), a field programmable gate array (FPGA), etc.) configured to extend an API for coordinating parallel computation to execute one or more offload kernels to perform a data operation request from a processor 122 of the compute device 102 and/or execute one or more in-built kernels to perform the data operation request inside the data storage device 150. It should be appreciated that the data storage device 150 may be embodied as any storage device, volume, namespace, or appliance, such as a solid-state drive (SSD), a hard disk drive (HDD), erasure-coded volumes, storage-rack-appliances, storage-namespaces, and storage partitions.

As shown in FIG. 1, the illustrative compute device 102 includes a compute engine (also referred to herein as "compute engine circuitry") 120, an input/output (I/O) subsystem 130, communication circuitry 140, and one or more data storage devices 150. It should be appreciated that, in other embodiments, the compute device 102 may include other or additional components, such as those commonly found in a computer (e.g., a display, peripheral devices, etc.). Additionally, in some embodiments, one or more of the illustrative components may be incorporated in, or otherwise form a portion of, another component. The compute engine 120 may be embodied as any type of device or collection of devices capable of performing various compute functions described below. In some embodiments, the compute engine 120 may be embodied as a single device such as an integrated circuit, an embedded system, a field-programmable gate array (FPGA), a system-on-a-chip (SOC), or other integrated system or device. In the illustrative embodiment, the compute engine 120 includes or is embodied as a processor 122 and a memory 124. The processor 122 may be embodied as any type of processor capable of performing the functions described herein. For example, the processor 122 may be embodied as a multi-core processor(s), a microcontroller, or other processor or processing/controlling circuit. In some embodiments, the processor 122 may be embodied as, include, or be coupled to an FPGA, an application specific integrated circuit (ASIC), reconfigurable hardware or hardware circuitry, or other specialized hardware to facilitate performance of the functions described herein.

The main memory 124 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the main memory 124 may be integrated into the processor 122. In operation, the main memory 124 may store various software and data used during operation such as applications, libraries, and drivers.

The compute engine 120 is communicatively coupled to other components of the compute device 102 via the I/O subsystem 130, which may be embodied as circuitry and/or components to facilitate input/output operations with the compute engine 120 (e.g., with the processor 122 and/or the main memory 124), the data storage device 150, and other components of the compute device 102. For example, the I/O subsystem 130 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 130 may form a portion of a system-on-a-chip (SoC) and be incorporated, along with one or more of the processor 122, the main memory 124, and other components of the compute device 102, into the compute engine 120.

The communication circuitry 140 may be embodied as any communication circuit, device, or collection thereof, capable of enabling communications over a network (not shown) between the compute device 102 and another compute device. The communication circuitry 140 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 140 includes a network interface controller (NIC) 142, which may also be referred to as a host fabric interface (HFI). The NIC 142 may be embodied as one or more add-in-boards, daughter cards, network interface cards, controller chips, chipsets, or other devices that may be used by the compute device 102 to connect with another compute device. In some embodiments, the NIC 142 may be embodied as part of a system-on-a-chip (SoC) that includes one or more processors, or included on a multichip package that also contains one or more processors. In some embodiments, the NIC 142 may include a local processor (not shown) and/or a local memory (not shown) that are both local to the NIC 142. In such embodiments, the local processor of the NIC 142 may be capable of performing one or more of the functions of the compute engine 120 described herein. Additionally or alternatively, in such embodiments, the local memory of the NIC 142 may be integrated into one or more components of the compute device 102 at the board level, socket level, chip level, and/or other levels.

The compute device 102 may include one or more data storage devices 150. In the illustrative embodiment, the data storage device 150 may be embodied as any type of device configured for short-term or long-term storage of data such as, for example, memory devices and circuits, memory cards, hard disk drives, solid-state drives, or other data storage device. The data storage device 150 may include a system partition that stores data and firmware code for the data storage device 150 and configuration data for features of the data storage device 150. The data storage device 150 may also include one or more operating system partitions that store data files and executables for operating systems. Additionally, in the illustrative embodiment, the data storage device 150 includes the performance logic unit 152.

Figure 2:
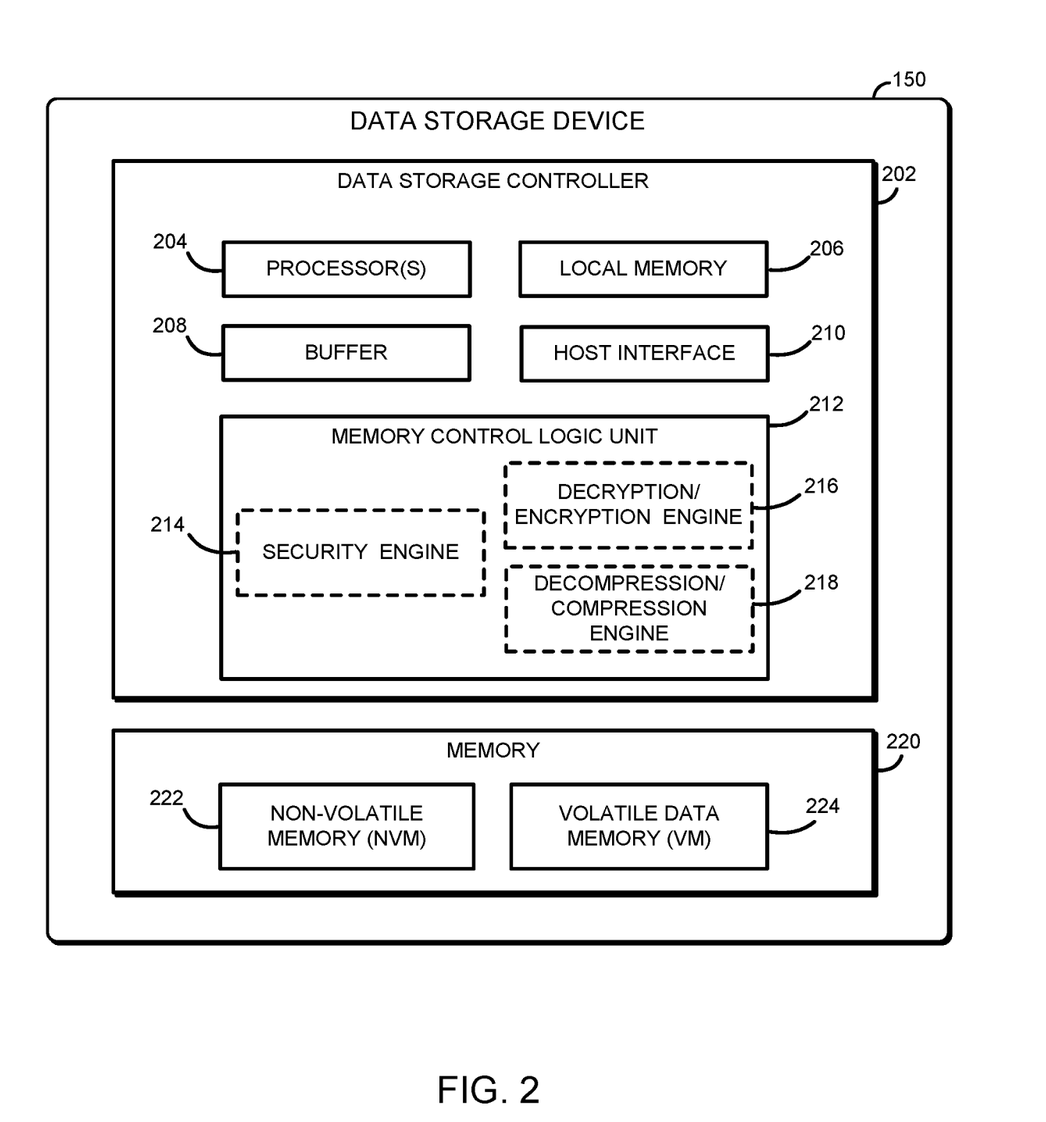
FIG. 2 is a simplified block diagram of at least one embodiment of the data storage device of FIG. 1.

Referring now to FIG. 2, in the illustrative embodiment, the data storage device 150 includes the data storage controller 202 and a memory 220, which illustratively includes a non-volatile memory 222 and a volatile memory 224. The data storage controller 202 may be embodied as any type of control device, circuitry or collection of hardware devices capable of extending an offload application program interface (API) to execute one or more offload kernels inside the data storage device 150 to perform data computation directly in the data storage device 150 and reading from and/or writing to the memory 220 (e.g., in response to requests from a host device, such as the compute device 102), as described in more detail herein. Additionally, the data storage controller 202 may execute one or more in-built kernels to perform a data operation request from the compute device 102 inside the data storage device 150. In the illustrative embodiment, the data storage controller 202 includes a processor (or processing circuitry) 204, a local memory 206, a host interface logic unit 210, and a memory control logic unit 212. In some embodiments, the processor 204, memory control logic unit 212, and the memory 220 may be included in a single die or integrated circuit. It should be appreciated that the data storage controller 202 may include additional devices, circuits, and/or components commonly found in a controller of a data storage device in other embodiments.

The processor 204 may be embodied as any type of processor capable of performing the functions disclosed herein. For example, the processor 204 may be embodied as a single or multi-core processor(s), digital signal processor, microcontroller, or other processor or processing/controlling circuit. Similarly, the local memory 206 may be embodied as any type of volatile and/or non-volatile memory or data storage capable of performing the functions disclosed herein. In the illustrative embodiment, the local memory 206 stores firmware and/or instructions executable by the processor 204 to perform the described functions of the data storage controller 202. In some embodiments, the processor 204 and the local memory 206 may form a portion of a System-on-a-Chip (SoC) and be incorporated, along with other components of the data storage controller 202, onto a single integrated circuit chip.

The host interface 210 may also be embodied as any type of hardware processor, processing circuitry, input/output circuitry, and/or collection of components capable of facilitating communication of the data storage device 150 with a host device (e.g., the compute device 102) or service. That is, the host interface 210 embodies or establishes an interface for accessing data stored on the data storage device 150 (e.g., stored in the memory 220). To do so, the host interface 210 may be configured to use any suitable communication protocol and/or technology to facilitate communications with the data storage device 150 depending on the type of data storage device. For example, the host interface 210 may be configured to communicate with a host device or service using Serial Advanced Technology Attachment (SATA), Peripheral Component Interconnect express (PCIe), Serial Attached SCSI (SAS), Universal Serial Bus (USB), and/or other communication protocol and/or technology in some embodiments.

The buffer 208 may be embodied as volatile memory used by data storage controller 202 to temporarily store data that is being read from or written to the memory 220 during data operation. The particular size of the buffer 208 may be dependent on the total storage size of the memory 220. The memory control logic unit 212 is illustratively embodied as hardware circuitry and/or devices (e.g., a processor, an ASIC, etc.) configured to control the read/write access to data at particular storage locations of the memory 220. It should be appreciated that, in some embodiments, the performance logic unit 152 may be embodied as the memory control logic unit 212.

In some embodiments, the memory control logic unit 212 may include a security engine 214, a decryption/encryption engine 216, and a decompression/compression engine 218. The security engine 214 may be embodied as circuitry and/or components that is configured to determine whether a particular data range of the memory 220 that a kernel is configured to read from or write to is a locked region or namespace. If the data range is on a locked region, then the security engine 214 is configured to determine whether a kernel that is configured to read from or write to the data range of the memory 220 has access to that the locked region.

The decryption/encryption engine 216 may be embodied as circuitry and/or a component that is configured to decrypt the input data read from the memory 220 or encrypt the output data that is to be written to the memory 220. Similarly, the decompression/compression engine 218 may be embodied as circuitry and/or a component that is configured to decompress the input data read from the memory 220 or compress the output data that is to be written to the memory 220.

The non-volatile memory 222 may be embodied as any type of data storage capable of storing data in a persistent manner (even if power is interrupted to non-volatile memory 222). For example, in the illustrative embodiment, the non-volatile memory 222 is embodied as a set of multiple non-volatile memory devices. The non-volatile memory devices of the non-volatile memory 222 are illustratively embodied as NAND Flash memory devices. However, in other embodiments, the non-volatile memory 222 may be additionally or alternatively include any combination of memory devices that use chalcogenide phase change material (e.g., chalcogenide glass), three-dimensional (3D) crosspoint memory, or other types of byte-addressable, write-in-place non-volatile memory, ferroelectric transistor random-access memory (FeTRAM), nanowire-based non-volatile memory, phase change memory (PCM), memory that incorporates memristor technology, Magnetoresistive random-access memory (MRAM) or Spin Transfer Torque (STT)-MRAM. The volatile memory 224 may be embodied as any type of data storage device or devices capable of storing data while power is supplied to the volatile memory 224, similar to the memory 220 described with reference to FIG. 2. For example, in the illustrative embodiment, the volatile memory 224 is embodied as one or more dynamic random-access memory (DRAM) devices.

Figure 3:
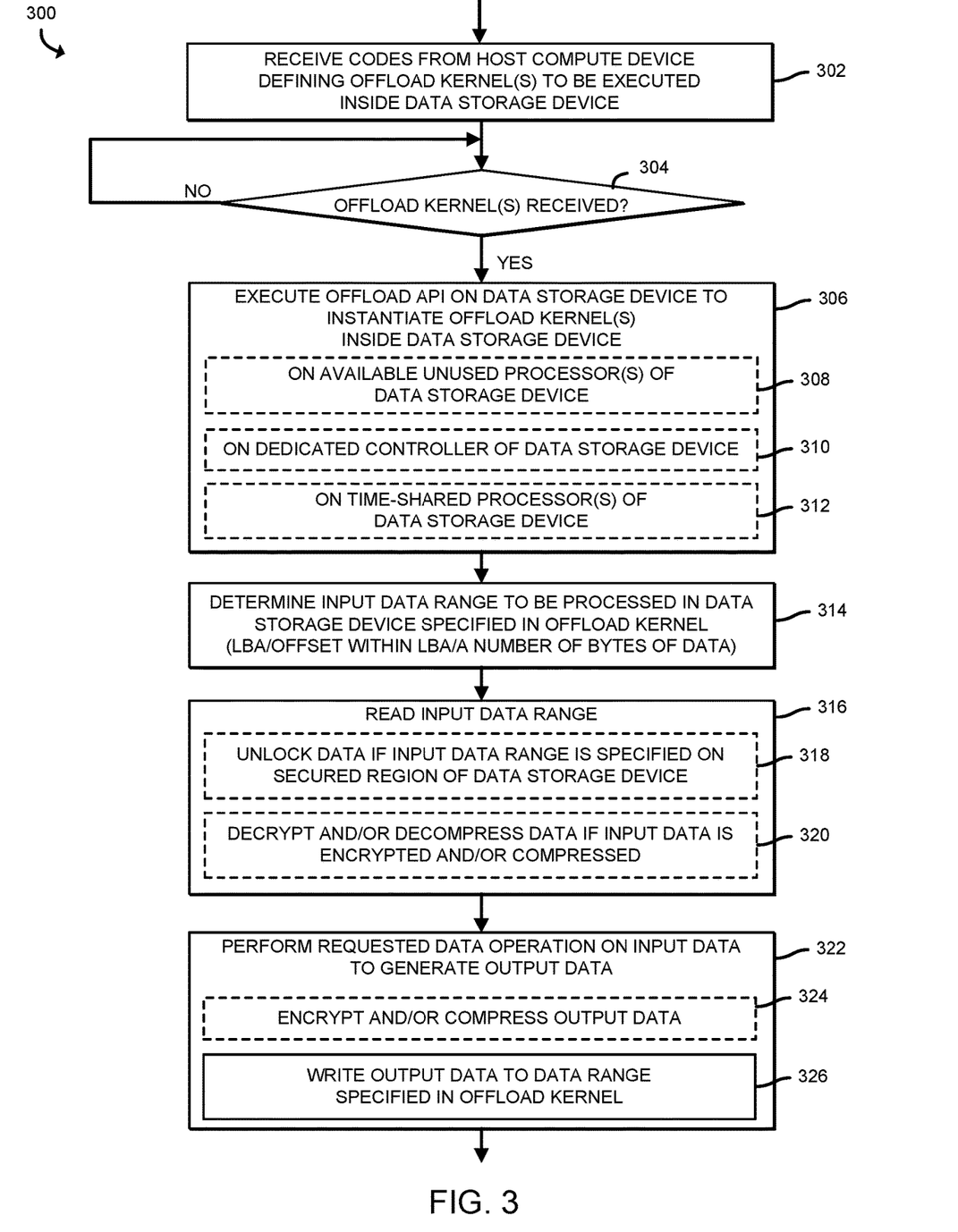
FIG. 3 is a simplified flow diagram of at least one embodiment of a method for offload kernel instantiation on a data storage device to perform a data operation that may be executed by the data storage device of FIGS. 1 and 2.

Referring now to FIG. 3, in use, the data storage device 150 may execute a method 300 for performing data operations or computations in the data storage device 150 by instantiating one or more offload kernels inside the data storage device 150. The method 300 begins with block 302 in which the data storage device 150 receives codes from a host compute device 102 defining one or more offload kernels to be executed inside the data storage device 150. As discussed further below, the host compute device 102 specifies the codes for one or more offload kernels to be executed on the data storage device(s) 150 and data ranges of the corresponding data storage device(s) 150 to be processed. If the data storage device 150 determines that the codes have not been received in block 304, the method 300 loops back to block 302 to continue monitoring for codes to be received from the compute device 102. If, however, the data storage device 150 determines that the codes have been received in block 304, the method 300 advances to block 306.

In block 306, the data storage device 150 executes an application program interface (API) on the data storage device 150 to instantiate the offload kernel(s) inside the data storage device 150. To do so, in some embodiments, the data storage device 150 may execute the API on an available and unused processor(s) 204 of the data storage device 150, as indicated in block 308. Alternatively, in some embodiments, the data storage device 150 may execute the API on a dedicated controller (e.g., a FPGA) of the data storage device 150. Alternatively, in some embodiments, the data storage device 150 may execute the API on a processor(s) 204 of the data storage device 150 that may be time-shared on the processor(s) 204 that is also used for other data storage operations. In such embodiments, a data storage device operating system (OS) may ensure that the offload kernel(s) is throttled to maintain a desired I/O performance for other applications and to not introduce denial-of-service attacks on core data storage operations. It should be appreciated that, in some embodiments, multiple data storage devices 150 may be included in a set (e.g., as storage sub-devices in a storage node).

In block 314, the data storage device 150 determines an input data range to be processed in the data storage device 150 specified in the offload kernel (e.g., an offload-read kernel). For example, the input data range may be indicated using a logical block address (LBA), an offset within the LBA, and a number of bytes of data to be read from the memory 220 of the data storage device 150. It should be appreciated that the offload kernel may specify multiple input data ranges to be processed.

Subsequently, in block 316, the data storage device 150 reads an input data range to be processed in the data storage device 150. To do so, the data storage device 150 determines whether the input data range is on a secured region (e.g., locked region or namespace) of the data storage device 150. If so, the data storage device 150 unlocks the input data range as illustrated in block 318. It should be appreciated that, in some embodiments, if the data storage device 150 determines that a kernel that is trying to access the locked input data range does not meet data security requirements, the data storage device 150 may alert a user of the compute device 102 and the offload-read kernel may be aborted. In other embodiments, the data storage device 150 may request the user to unlock the input data range.

Additionally, the data storage device 150 may determine whether an output data stream is specified on a secured region. If the data storage device 150 determines that output data is to be written on a secured region and a offload-write kernel that is configured to write the output data does not have access to write the output data on the specified secured region, the data storage device 150 may alert a user of the compute device 102 and the offload-read kernel may be aborted prior to reading or processing the data. It should be appreciated that, in some embodiments, the data storage device 150 may request the user to unlock the output data range. In some embodiments, as illustrated in block 320, the data storage device 150 may decrypt and/or decompress the input data if the input data is encrypted and/or compressed, respectively.

Subsequently, in block 322, the data storage device 150 performs a requested data operation on the input data read from the memory 220 of the data storage device 150 to generate output data. In some embodiments, the output data may be encrypted and/or compressed by a corresponding kernel as illustrated in block 324. For example, the corresponding kernel may be an offload-compute kernel or an in-built compute kernel of the data storage device 150. The output data is then written in the data range specified in an offload-write kernel as indicated in block 326. It should be appreciated that, similar to the input data ranges, the offload kernel may specify multiple data ranges that the output data is to be written.

For example, the data storage device 150 may receive the OpenCL offload kernels from the host compute device 102 that requests to compress specified input data stored in the data storage device 150 and write compressed data to a specified data location of the data storage device 150. It should be appreciated that OpenCL includes mechanisms for pipelining OpenCL offload kernels to perform a data operation of required offloads. In such example, a first offload kernel may read the uncompressed input data at a physical data range specified by the host compute device 102 (e.g., a LBA, an offset within the LBA, and a number of bytes of data to be read). The first offload kernel outputs the input data to a second offload kernel to compress the input data. Once the input data is compressed, the second offload kernel outputs the compressed data to a third offload kernel. Subsequently, the third offload kernel writes the compressed data to a memory location on the data storage device 150 specified by the host compute device 102. In other words, the data process is done inside the data storage device 150, which obviates a need for transmitting the input data to and from the host compute device 102.

Figure 4:
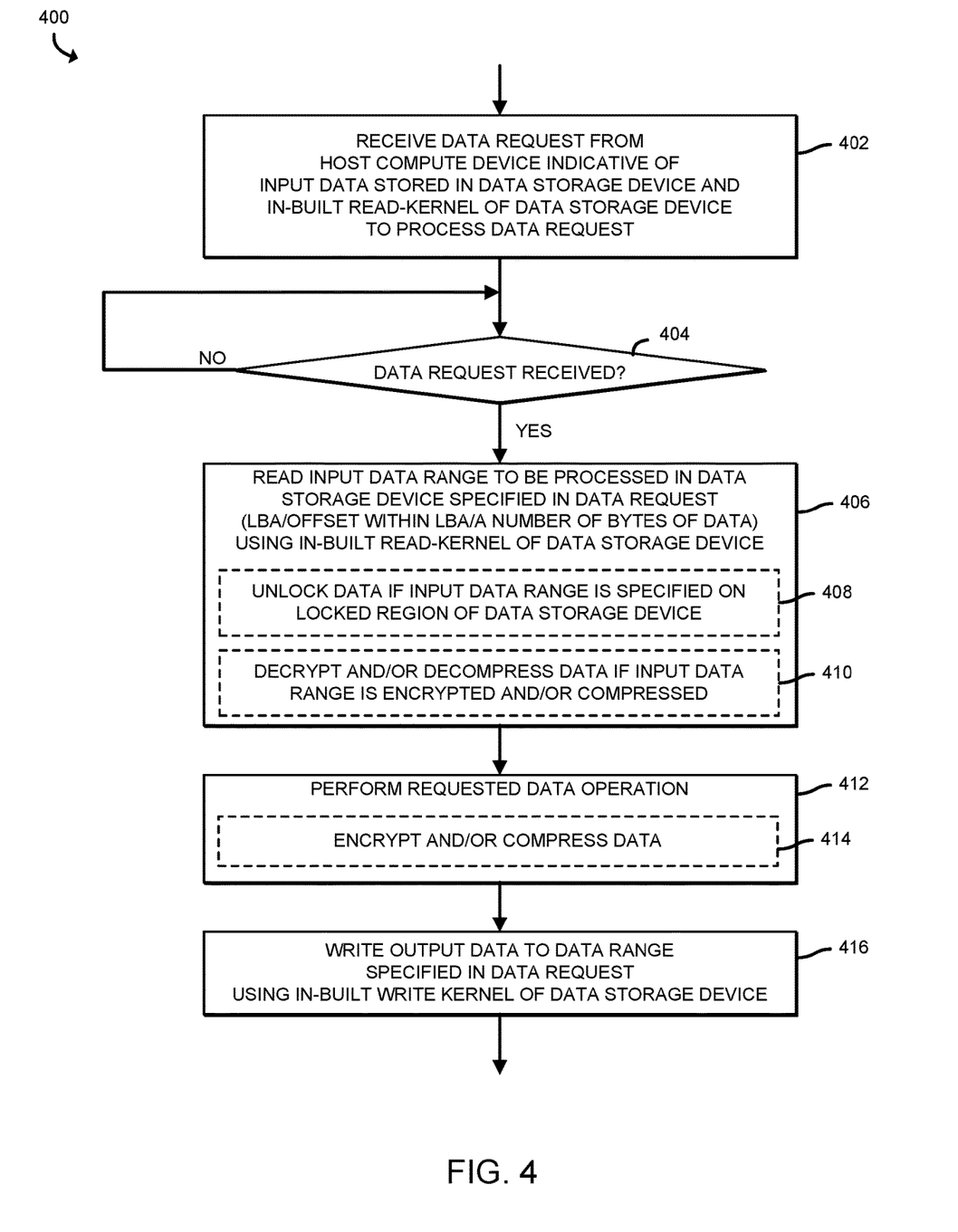
FIG. 4 is a simplified flow diagram of at least one embodiment of a method for performing a data operation using in-built data storage kernels inside a data storage device that may be executed by the data storage device of FIGS. 1 and 2.

Referring now to FIG. 4, in use, the data storage device 150 may execute a method 400 for performing a data operation or computation inside the data storage device 150 using one or more in-built kernels of the data storage device 150. The method 400 begins with block 402 in which the data storage device 150 receives a data request from the host compute device 102. In the illustrative embodiment, the data request indicates an input data range stored in the data storage device 150 and specifies an in-built read-kernel of the data storage device 150 that is to process the data request. If the data storage device 150 determines that the data request has not been received in block 404, the method 400 loops back to block 402 to continue monitoring for a data request from the compute device 102. If, however, the data storage device 150 determines that the data request has been received in block 404, the method 400 advances to block 406.

In block 406, the data storage device 150 reads the input data range to be processed in the data storage device 150 specified in the data request using an in-built read-kernel of the data storage device 150. For example, the data request may indicate a LBA, an offset within the LBA, and a number of bytes of data to be read. To do so, the data storage device 150 determines whether the input data range is on a secured region (e.g., locked region or namespace) of the data storage device 150. If so, the data storage device 150 unlocks the input data range as illustrated in block 408. It should be appreciated that, in some embodiments, if the data storage device 150 determines that a kernel that is trying to access the locked input data range does not meet data security requirements, the data storage device 150 may alert a user of the compute device 102 and the kernel may be aborted. In other embodiments, the data storage device 150 may request the user to unlock the input data range.

Additionally, the data storage device 150 may determine whether an output data stream is specified on a secured region. If the data storage device 150 determines that output data is to be written on a secured region and an in-built-write kernel that is configured to write the output data does not have access to write the output data on the specified secured region, the data storage device 150 may alert a user of the compute device 102 and the in-built-read kernel may be aborted prior to reading or processing the data. It should be appreciated that, in some embodiments, the data storage device 150 may request the user to unlock the output data range. In some embodiments, as illustrated in block 410, the data storage device 150 may decrypt and/or decompress the input data if the input data is encrypted and/or compressed, respectively.

Subsequently, in block 412, the data storage device 150 performs a requested data operation on the input data read from the memory 220 of the data storage device 150 to generate output data. In some embodiments, the output data may be encrypted and/or compressed by an in-built compute kernel as illustrated in block 414. In block 416, the data storage device 150 writes the output data to the data range specified in the data request using an in-built write-kernel of the data storage device 150.

EXAMPLES

Illustrative examples of the technologies disclosed herein are provided below. An embodiment of the technologies may include any one or more, and any combination of, the examples described below.

Example 1 includes a data storage device comprising a memory; and a data storage controller to receive a data request from a compute device; determine an input data range specified in the data request by the compute device to be processed in the data storage device without sending the input data located at the data storage to the compute device; read input data from the input data range; perform a data operation on the input data specified by the compute device to generate output data; and write the output data to an output data range specified by the compute device.

Example 2 includes the subject matter of Example 1, and wherein the input data range is specified by a logical block address, an offset within the logical block address, and a number of bytes of input data to be processed, and the output data range is specified by a logical block address, an offset within the logical block address, and a number of bytes where the output data is to be written.

Example 3 includes the subject matter of any of Examples 1 and 2, and wherein the data storage controller is further to execute, in response to receiving the data request, an application program interface to instantiate the one or more offload kernels inside the data storage device, wherein the data request includes codes that are to be executed on the data storage device to deploy one or more offload kernels, wherein the codes are specified in a heterogeneous-programming language.

Example 4 includes the subject matter of any of Examples 1-3, and wherein to instantiate the one or more offload kernels comprises to execute the one or more offload kernels on one or more available unused processors of the data storage device.

Example 5 includes the subject matter of any of Examples 1-4, and wherein to instantiate the one or more offload kernels comprises to execute the one or more offload kernels on a dedicated controller of the data storage device.

Example 6 includes the subject matter of any of Examples 1-5, and wherein to instantiate the one or more offload kernels comprises to execute the one or more offload kernels on one or more processors of the data storage device that also perform other operations of the data storage device.

Example 7 includes the subject matter of any of Examples 1-6, and wherein to perform the data operation comprises to perform a data operation by the one or more offload kernels inside the data storage device.

Example 8 includes the subject matter of any of Examples 1-7, and wherein to read the input data range comprises to read an input data range using an in-built read-kernel of the data storage device specified in the data request; and to perform the data operation comprises to perform a data operation by an in-built kernel of the data storage device, Example 9 includes the subject matter of any of Examples 1-8, and wherein to read the input data range comprises to unlock, in response to a determination that the input data range is on a locked region of the data storage device and by the data storage device, the input data range; decrypt, in response to a determination that the input data range is encrypted and by the data storage device, the input data range; and decompress, in response to a determination that the input data range is compressed and by the data storage device, the input data range.

Example 10 includes one or more machine-readable storage media comprising a plurality of instructions stored thereon that, in response to being executed, cause a data storage device to receive a data request from a compute device; determine an input data range specified by the compute device to be processed in the data storage device without sending data located at the input data to the compute device; read input data from the input data range; perform a data operation on the input data specified by the compute device to generate output data; and write the output data to an output data range specified by the compute device.

Example 11 includes the subject matter of Example 10, and wherein the input data range is specified by a logical block address, an offset within the logical block address, and a number of bytes of input data to be processed, and the output data range is specified by a logical block address, an offset within the logical block address, and a number of bytes where the output data is to be written.

Example 12 includes the subject matter of any of Examples 10 and 11, and further including a plurality of instructions that in response to being executed cause the data storage device to execute, in response to receiving the data request, an application program interface to instantiate the one or more offload kernels inside the data storage device, wherein the data request includes codes that are to be executed on the data storage device to deploy one or more offload kernels, wherein the codes are specified in a hetero-geneous-programming language.

Example 13 includes the subject matter of any of Examples 10-12, and wherein to instantiate the one or more offload kernels comprises to execute the one or more offload kernels on one or more available unused processors of the data storage device.

Example 14 includes the subject matter of any of Examples 10-13, and wherein to instantiate the one or more offload kernels comprises to execute the one or more offload kernels on a dedicated controller of the data storage device.

Example 15 includes the subject matter of any of Examples 10-14, and wherein to instantiate the one or more offload kernels comprises to execute the one or more offload kernels on one or more processors of the data storage device that also perform other operations of the data storage device.

Example 16 includes the subject matter of any of Examples 10-15, and wherein to perform the data operation comprises to perform a data operation by the one or more offload kernels inside the data storage device.

Example 17 includes the subject matter of any of Examples 10-16, and wherein to read the input data range comprises to read an input data range using an in-built read-kernel of the data storage device; and to perform the data operation comprises to perform a data operation by an in-built kernel of the data storage device.

Example 18 includes the subject matter of any of Examples 10-17, and wherein to read the input data range comprises to unlock, in response to a determination that the input data range is on a locked region of the data storage device and by the data storage device, the input data range; decrypt, in response to a determination that the input data range is encrypted and by the data storage device, the input data range; and decompress, in response to a determination that the input data range is compressed and by the data storage device, the input data range.

Example 19 includes a method comprising receiving, by a data storage device, a data request from a compute device, determining, by the data storage device, an input data range specified by the compute device to be processed in the data storage device without sending data located at the input data to the compute device; reading, by a data storage device, input data from the input data range; performing, by the data storage device, a data operation on the input data specified by the compute device to generate output data; and writing, by the data storage device, the output data to an output data range specified by the compute device.

Example 20 includes the subject matter of Example 19, and wherein the input data range is specified by a logical block address, an offset within the logical block address, and a number of bytes of input data to be processed, and the output data range is specified by a logical block address, an offset within the logical block address, and a number of bytes where the output data is to be written.

Example 21 includes the subject matter of any of Examples 19 and 20, and further including executing, in response to receiving the data request and by the data storage device, an application program interface to instantiate the one or more offload kernels inside the data storage device, wherein the data request includes codes that are to be executed on the data storage device to deploy one or more offload kernels, wherein the codes are specified in a hetero-geneous-programming language.

Example 22 includes the subject matter of any of Examples 19-21, and wherein to instantiate the one or more offload kernels comprises to execute the one or more offload kernels on one or more available unused processors of the data storage device or on a dedicated controller of the data storage device.

Example 23 includes the subject matter of any of Examples 19-22, and wherein to instantiate the one or more offload kernels comprises to execute the one or more offload kernels on one or more processors of the data storage device that also perform other operations of the data storage device.

Example 24 includes the subject matter of any of Examples 19-23, and wherein performing the data operation comprises performing a data operation by the one or more offload kernels inside the data storage device.

Example 25 includes the subject matter of any of Examples 19-24, and wherein reading the input data range comprises reading an input data range using an in-built read-kernel of the data storage device; and performing the data operation comprises performing a data operation by an in-built kernel of the data storage device.

The invention claimed is:

1. A data storage device comprising a data storage controller to:
   receive a data request from a compute device, wherein the data request includes codes that are executable to instantiate one or more offload kernels;
   execute, in response to receipt of the data request, an application program interface to instantiate the one or more offload kernels inside the data storage device using the codes;
   determine an input data range specified in the data request by the compute device to be processed in the data storage device without sending the input data located at the data storage to the compute device;
   read input data from the input data range;
   perform a data operation on the input data specified by the compute device to generate output data; and
   write the output data to an output data range specified by the compute device.

2. The data storage device of claim 1, wherein the input data range is specified by a logical block address, an offset within the logical block address, and a number of bytes of input data to be processed, and the output data range is specified by a logical block address, an offset within the logical block address, and a number of bytes where the output data is to be written.

3. The data storage device of claim 1, wherein the codes are specified in a heterogeneous-programming language.

4. The data storage device of claim 3, wherein to instantiate the one or more offload kernels comprises to execute the one or more offload kernels on one or more available unused processors of the data storage device.

5. The data storage device of claim 3, wherein to instantiate the one or more offload kernels comprises to execute the one or more offload kernels on a dedicated controller of the data storage device.

6. The data storage device of claim 3, wherein to instantiate the one or more offload kernels comprises to execute the one or more offload kernels on one or more processors of the data storage device that also perform other operations of the data storage device.

7. The data storage device of claim 3, wherein to perform the data operation comprises to perform a data operation by the one or more offload kernels inside the data storage device.

8. The data storage device of claim 1, wherein:
to read the input data range comprises to read an input data range using an in-built read-kernel of the data storage device specified in the data request; and
to perform the data operation comprises to perform a data operation by an in-built kernel of the data storage device.

9. The data storage device of claim 1, wherein to read the input data range comprises to:
unlock, in response to a determination that the input data range is on a locked region of the data storage device and by the data storage device, the input data range;
decrypt, in response to a determination that the input data range is encrypted and by the data storage device, the input data range; and
decompress, in response to a determination that the input data range is compressed and by the data storage device, the input data range.

10. One or more non-transitory, computer-readable storage media comprising a plurality of instructions stored thereon that, in response to being executed, cause a data storage device to:
receive a data request from a compute device, wherein the data request includes codes that are executable to instantiate one or more offload kernels;
execute, in response to receipt of the data request, an application program interface to instantiate the one or more offload kernels inside the data storage device using the codes;
determine an input data range specified by the compute device to be processed in the data storage device without sending data located at the input data to the compute device;
read input data from the input data range;
perform a data operation on the input data specified by the compute device to generate output data; and
write the output data to an output data range specified by the compute device.

11. The one or more non-transitory, computer-readable storage media of claim 10, wherein the input data range is specified by a logical block address, an offset within the logical block address, and a number of bytes of input data to be processed, and the output data range is specified by a logical block address, an offset within the logical block address, and a number of bytes where the output data is to be written.

12. The one or more non-transitory, computer-readable storage media of claim 10, wherein the codes are specified in a heterogeneous-programming language.

13. The one or more non-transitory, computer-readable storage media of claim 12, wherein to instantiate the one or more offload kernels comprises to execute the one or more offload kernels on one or more available unused processors of the data storage device.

14. The one or more non-transitory, computer-readable storage media of claim 12, wherein to perform the data operation comprises to perform a data operation by the one or more offload kernels inside the data storage device.

15. The one or more non-transitory, computer-readable storage media of claim 10, wherein:
to read the input data range comprises to read an input data range using an in-built read-kernel of the data storage device; and
to perform the data operation comprises to perform a data operation by an in-built kernel of the data storage device.

16. The one or more non-transitory, computer-readable storage media of claim 12, wherein to read the input data range comprises to:
unlock, in response to a determination that the input data range is on a locked region of the data storage device and by the data storage device, the input data range;
decrypt, in response to a determination that the input data range is encrypted and by the data storage device, the input data range; and
decompress, in response to a determination that the input data range is compressed and by the data storage device, the input data range.

17. A method comprising:
receiving, by a data storage device, a data request from a compute device, wherein the data request includes codes that are executable to instantiate one or more offload kernels;
executing, in response to receipt of the data request, an application program interface to instantiate the one or more offload kernels inside the data storage device using the codes;
determining, by the data storage device, an input data range specified by the compute device to be processed in the data storage device without sending data located at the input data to the compute device;
reading, by a data storage device, input data from the input data range;
performing, by the data storage device, a data operation on the input data specified by the compute device to generate output data; and
writing, by the data storage device, the output data to an output data range specified by the compute device.

18. The method of claim 17, wherein the input data range is specified by a logical block address, an offset within the logical block address, and a number of bytes of input data to be processed, and the output data range is specified by a logical block address, an offset within the logical block address, and a number of bytes where the output data is to be written.

19. The method of claim 17, wherein the codes are specified in a heterogeneous-programming language.

20. The method of claim 17, wherein:
reading the input data range comprises reading an input data range using an in-built read-kernel of the data storage device; and
performing the data operation comprises performing a data operation by an in-built kernel of the data storage device.

* * * * *